Dec. 6, 1949     R. E. BOYDEN     2,490,200
DIFFERENTIAL ACTUATING MECHANISM
Original Filed March 13, 1945     2 Sheets-Sheet 2

INVENTOR.
ROBERT E. BOYDEN
BY
ATTORNEY

Patented Dec. 6, 1949

2,490,200

UNITED STATES PATENT OFFICE 2,490,200

DIFFERENTIAL ACTUATING MECHANISM

Robert E. Boyden, Los Angeles, Calif., assignor to Clary Multiplier Corporation, Los Angeles, Calif., a corporation of California Original application March 13, 1945, Serial No. 582,553. Divided and this application December 27, 1946, Serial No. 718,706

8 Claims. (Cl. 235—79)

This invention relates to calculating machines or the like and has particular reference to differential rack drive mechanisms.

As is well known in the art of rack driven machines of the above type, the racks are differentially driven different extents, generally under control of settable value selecting keys, to actuate accumulator elements and other differentially driven devices of the machine.

Heretofore, such racks were commonly driven by a universal actuator through yieldable springs so that the actuator could travel through a uniform excursion regardless of the different extents of movement to which the racks were allowed to travel under control of their associated keys. This form of rack drive has proved very satisfactory in machines of moderate speed. However, difficulties are encountered in operating this type of rack drive at high speeds or under heavy rack load conditions due to the possibility of rebound of the racks against their springs after striking the associated set value keys, and also due to stretching of the springs when inertia or friction reactions in the driven racks approaches the initial tension provided in the springs. Other difficulties occur in totaling operations at times when the rack drive springs are stretched to a maximum and the racks are demeshed from their accumulator elements. The consequent forward acceleration of the racks and their abrupt stopping creates a considerable amount of noise and jarring and in many cases special devices have been incorporated in such machines to prevent such action.

On the other hand, positive acting devices which release the racks from their actuators upon contacting a set value key have been used to some extent. However, this form of rack drive is in general quite complicated and requires considerably more space than the spring type.

One object of the present invention is to provide an improved yieldable drive connection for a differentially driven rack or the like device for actuating the accumulator and/or other devices of a calculating machine.

Another object is to provide a yieldable rack drive connection which is adequate to transmit a driving movement to a rack for any of a number of different extents of travel and which thereafter exerts a minimum driving effort on the rack.

Another object is to provide a rack drive mechanism which both differentially drives and supports the racks.

Another object is to facilitate assembly of the elements of a rack drive mechanism.

The manner in which the above and other objects of the invention are accomplished will be readily understood on reference to the following specification when read in conjunction with the accompanying drawings, wherein.

The present invention is disclosed in connection with the well known motor driven Clary adding machine disclosed and claimed in the copending application of Robert E. Boyden, Serial Number 582,553, filed March 13, 1945, and entitled "Calculating machine." The present application is a division of said copending application and reference is hereby made thereto for a disclosure and understanding of details of the machine not specifically disclosed herein.

Figure 1:
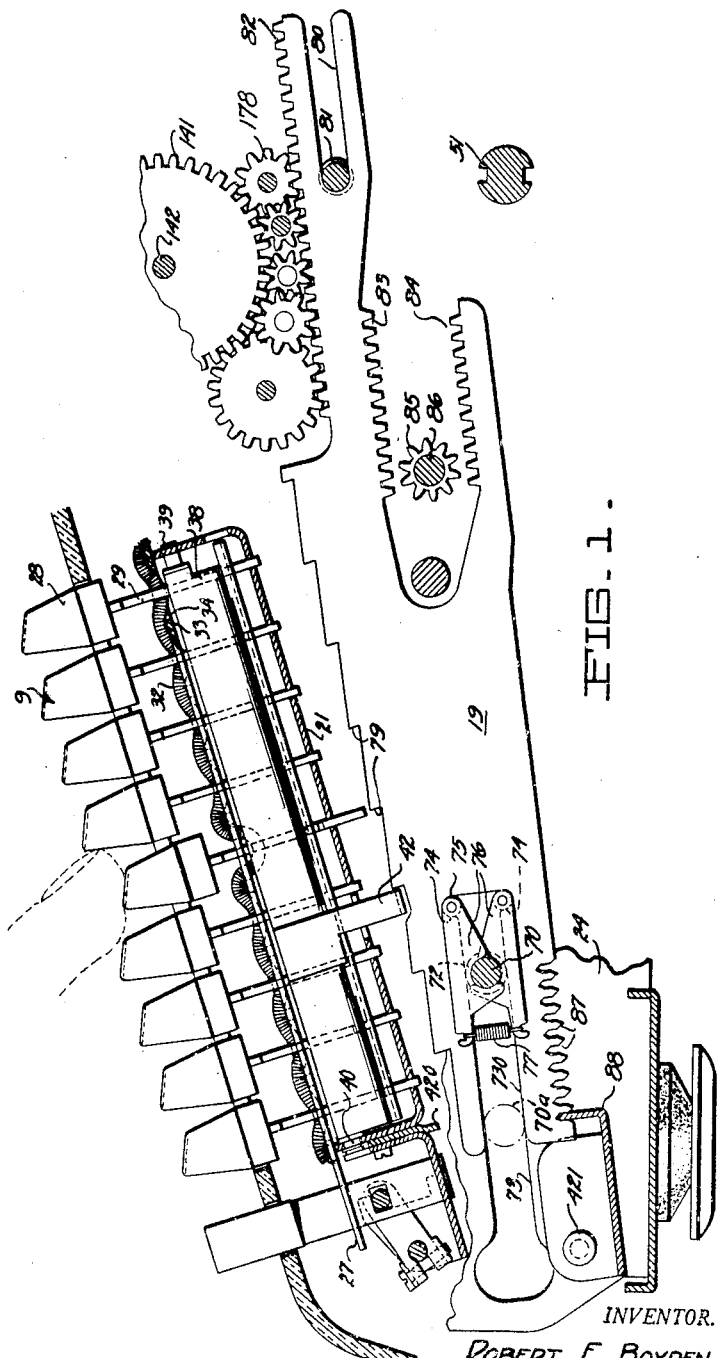
Fig. 1 is a longitudinal sectional view through a machine embodying the present invention.

The illustrated machine comprises a plurality of banks or rows of value selecting keys, one of which is shown in Fig. 1, each row comprising a series of nine keys 9 ranging in value from 1 to 9. Each row of keys 9 is associated with a drive rack 19.

Each key 9 comprises a keytop 28 of plastic or the like integral with a keystem 29. The latter is slidably fitted in aligned slots in a key frame 21 and a plate 27. The frame and plate are integrally attached together and suitably fixed to machine side frame plates partly shown at 23 and 24 in Figs. 2 and 1, respectively.

The keys in each bank are yieldably pressed upward by a tension spring 32 extending the length of the keyboard and suitably attached at opposite ends to the plate 27. Said spring rests upon crossribs 33, one formed between each two adjacent keys and extending across a slot 34 in the plate. The spring 32 extends through openings in each of the keystems and upon depression of a key, the adjacent portions of the spring are stretched and extend downwardly through the adjacent slot 34.

Means are provided for locking the keys 9 in their depressed positions and for releasing any depressed key. For this purpose, each keystem has a cam lobe (not shown) formed thereon, which, when the key is depressed, rocks a locking bail 38 pivoted at either end thereof to the front and rear walls of the key frame 21 by trunnion bearings 39 and 40. At the end of its stroke the cam lobe on the key passes below the bail, enabling the latter to retract partially under the action of a spring (not shown) to a position where it latches the key depressed.

A zero stop 42 is attached to each locking bail 38, and when no key 9 in any one order is depressed, the bail 38 of that order will be spring held in an extreme inwardly rocked position in which the zero stop lies directly in front of one of a series of shoulders 79 on the associated rack 19, thereby preventing any substantial forward movement of the rack during subsequent phases of operation of the machine. However, when any amount key is depressed and latched down, the locking bail will be held outward sufficiently to retain the associated zero stop out of the path of the aligned rack.

The spacings between the equally spaced shoulders 79 on the rack 19 are slightly larger than the spacing between the keystems 29 in each row so that the rack, when advanced toward the front of the machine (to the left in Fig. 1), will strike the lower end of a depressed key after it has been moved a number of increments equal to the value of such depressed key. In the event an amount key representative of the value "nine" has been depressed, the rack will not be stopped thereby but will continue until the second shoulder 79 from the left (as viewed in Fig. 1) strikes a "9" stop bar 420 integrally secured to the forward wall of the key frame 21.

Each of the racks 19 is adapted, when driven forward, to drive its respective accumulator and printer elements. For this purpose, each rack has a rack gear section 82, in mesh with one of a series of pinions, one of which is indicated at 176, operatively connected with an associated one of a series of idler gears 141. The latter drive elements of the printer mechanism (not shown).

Opposed rack gear sections 83 and 84 are also formed on each rack 19 on opposite sides of an accumulator gear 85 rotatably mounted on an accumulator shaft 86. During additive operations, the shaft 86 is lowered, meshing the gears 85 with the rack gear sections 83 of the associated racks so that, as the respective rack is moved forward, the accumulator gears will be rotated additively various amounts corresponding to the extent of movement of the associated racks. Conversely, during subtractive operations, the shaft 86 is raised to mesh the gears 85 with the lower rack gear sections 84. Thus, as the racks are moved forward, the associated accumulator gears will be rotated subtractively thereby.

Figure 2:
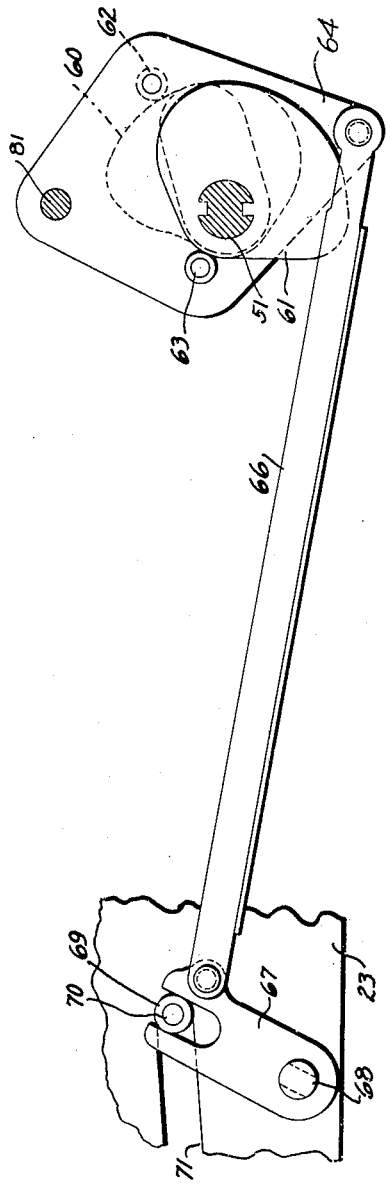
Fig. 2 is a side view illustrating the rack drive actuating mechanism.

The racks 19 are reciprocated in an endwise movement once during each cycle of the machine by a rack drive mechanism driven by a cyclically operable shaft 51. The latter is rotated one complete rotation during each cycle and has keyed thereon a pair of juxtaposed complementary cams 60 and 61 (Fig. 2). These cams are engaged by rollers 62 and 63, respectively, mounted on a cam follower plate 64 straddling the shaft 51 and pivoted on a cross shaft 81. A link 66 is pivotally connected between the cam follower plate 64 and an arm 67 secured to a rock shaft 68 which is journalled in bearings formed in machine frame plates 23 and 24. The upper end of the arm 67 is bifurcated to embrace a roller 69 journalled on the right hand end of a rack drive shaft 70. The roller 69 is also guided in a fore and aft movement by a slot 71 formed in the right hand machine frame plate 23 to likewise guide one end of the rack drive shaft 70.

A roller 72 (Fig. 1) on the opposite end of the shaft 70 is guided along a second slot 73, similar to slot 71, formed in the left hand machine frame plate 24. A second arm (not shown), similar to arm 67, is preferably fixed to the shaft 68 to embrace the roller 72 and thus guide the left hand end of shaft 70 to insure parallel movement of the latter during its transverse shifting movement between its full line position shown in Fig. 1 and an alternate position indicated by dot and dash lines 70a.

According to the present invention, each of the drive racks 19 has an elongated slot 730 therein which is open at the forward end thereof to embrace an adjacent bearing portion on the shaft 70. The slot extends parallel to the length of the rack whereby the shaft may support the latter at its forward end throughout the rack travel. The slot 730 terminates at its rear end in opposed lateral depressions or notches 74. Each of these depressions is normally engaged by a roller 75 carried by a pawl or drive element 76 which is rockably fitted over a circular bearing portion formed at the bottom of a groove in the shaft 70 adjacent the rack. The two elements 76 associated with any one rack are located adjacent each other in the same groove and are spring urged in opposite directions about the shaft by a tension spring 77 connected between the tails of the two elements, thus forming a yieldable connection between the shaft 70 and the respective drive rack 19.

It will be noted that the bearing portion formed in each of the elements 76 is semi-circular in shape to facilitate assembly of the elements on the shaft and to enable the elements to be fitted within grooves formed in the shaft. The particular construction and assembly of the elements holds the latter in place and at the same time permits ready disassembly as well as assembly of the parts.

When, during the forward bodily movement of the shaft 70 toward its forward position 70a, a rack is stopped due to striking a depressed key stem 29 or the "stationary" nine stop 420, the roller 75 will ride out of the depression 74, against the action of spring 77, thus breaking the connection between the rack and the shaft.

It will be noted from the above described construction that the same amount of reaction will be required to "break" the connection between the shaft 70 and the various racks 19 regardless of the amount of travel of the latter before reaching the "breaking" point. Also, it will be noted that after the connections have broken, there will be only a small drag offered by the action of the rollers 75 as they roll along the opposed edges of each rack slot 730. During the return movement of the shaft 70 to its home position illustrated in Fig. 1, the rollers 75 will move along the opposed edges of the slot 730 until they snap into the depressions 74, thus reconstituting the connection between the shaft and the rack to return all racks which have been advanced from their home positions of Fig. 1 back to such positions.

Each rack, in addition to being guided at its forward end by the shaft 70, is provided with a slot 80 adjacent the rear end thereof whereby the rack is guided over a stationary cross rod 81 extending between the machine frame plates 23 and 24.

Means are provided to locate each of the racks 19 in its differentially adjusted position and in its home position illustrated in Fig. 1 during different portions of a machine cycle. For this purpose, a series of notches 87 are formed on the under forward edge of each rack 19 and are spaced apart distances equal to the different increments of movement of the racks. Certain of the notches, depending on the positions of the racks, are engaged by a locking bail 88 before and after the forward and return movements of the rack. For this purpose, the bail is pivoted at opposite ends thereof on trunnion pins 421 extending from the machine side frame plates and is rocked in a manner not shown operable in timed relation with the aforementioned rack drive mechanism.

Certain of the subject matter disclosed but not claimed herein is claimed in my copending application, Serial No. 719,244, filed December 30, 1946.

Although I have described my invention in detail and have therefore used certain specific terms and languages herein, it is to be understood that the present disclosure is illustrative rather than restrictive, and changes and modifications may be made without departing from the spirit or scope of the invention as set forth in the claims appended hereto.

Having thus described the invention, what I desire to secure by United States Letters Patent is:

1. A calculating machine comprising the combination with an accumulator, a rack for driving said accumulator, and means for selectively limiting the extent of movement of said rack different amounts; of a slot in said rack extending parallel to the path of movement of said rack, means for driving said rack comprising a member having a bearing portion movable in said slot for supporting said rack, a yieldable connection between said member and said rack comprising notches in opposite edges of said slot, said member having a circular bearing portion thereon, a pair of oppositely disposed pawls having substantially semi-circular bearing portions rockable on said circular bearing portion of said member, means on said pawls on one side of said bearing portions thereof engageable with said notches, and spring means extending between said pawls on the opposite side of said bearing portions thereof for causing said pawls to yieldably engage said engaging means with said notches, said engaging means being arranged to move out of said notches and along said opposite edges of said slot and in contact therewith after said rack is arrested by said limiting means.

2. A calculating machine comprising the combination with an accumulator, a rack for driving said accumulator, and means for selectively limiting the extent of movement of said rack different amounts; of a slot in said rack extending parallel to the path of movement of said rack, means for driving said rack comprising a member movable in said slot and having a constant excursion, said member supporting said rack, a yieldable connection between said member and said rack comprising notches in opposite edges of said slot, pawls carried by said member and engageable with respective ones of said notches, and spring means extending between said pawls for urging said pawls into engagement with said notches, said pawls being arranged to move out of said notches and along said opposite edges of said slot and in contact therewith after said rack is arrested by said limiting means.

3. A calculating machine comprising the combination with a device, driving means for said device including a member having a slot therein extending parallel to the direction of movement of said member, and means for selectively limiting the extent of movement of said member different amounts; of means for driving said member including a second member movable along said slot and supporting said first mentioned member, and a yieldable connection between said members comprising notches in the opposite edges of said slot, pawls carried by said second member and adapted to extend into said notches, and spring means for yieldably maintaining said pawls in respective ones of said notches.

4. A calculating machine comprising the combination with a device, driving means for said device including a member having a guideway, and means for selectively limiting the extent of movement of said member different amounts; of means for moving said member including a second member movable along said guideway and thereby supporting said first mentioned member, and a yieldable connection between said members comprising a notch in said guideway, a pawl carried by said second member, and spring means for yieldably maintaining said pawl in said notch, said pawl being adapted to move out of said notch when said limiting means limits said first mentioned member from movement.

5. A calculating machine comprising the combination with an accumulator, driving means for said accumulator including a member, means for actuating said member including a second member, and means for selectively limiting the extent of actuation of said first mentioned member different amounts; of a yieldable connection between said members comprising a pair of oppositely disposed notches in one of said members, a pair of pawls carried by the other of said members, and spring means extending between said pawls for yieldably maintaining the same in respective ones of said notches.

6. A calculating machine comprising the combination with an accumulator, a rack for driving said accumulator, and means for selectively limiting the extent of movement of said rack different amounts; of a slot in said rack extending parallel to the path of movement of said rack, means for driving said rack comprising a rod transversely movable in said slot for supporting said rack, a yieldable connection between said member and said rack comprising a notch in one edge of said slot, a pawl rockably mounted on said rod, means on said pawl engageable with said notch, and spring means for causing said pawl to yieldably engage said engaging means with said notch, said engaging means being arranged to move out of said notch and along said edge of said slot and in contact therewith after said rack is arrested by said limiting means.

7. A calculating machine comprising the combination with an accumulator, a rack for driving said accumulator, and means for selectively limiting the extent of movement of said rack different amounts; of a slot in said rack extending parallel to the path of movement of said rack, means for driving said rack comprising a member movable in said slot and having a constant excursion, a yieldable connection between said member and said rack comprising a notch in one edge of said slot, a pawl carried by said member and engageable with said notch, and spring means for urging said pawl into engagement with said notch, said pawl and said notch being arranged to cause said pawl to move out of said notch and along said edge of said slot after said rack is arrested by said limiting means and upon movement of said member in one direction, said rack being arranged to maintain said pawl in said notch upon movement of said member in the opposite direction.

8. In a non-positive rack drive mechanism for a calculating machine, having a rack and stop means for selectively limiting the extent of movement of said rack different amounts; a slot in said rack extending parallel to the path of movement of said rack, means for driving said rack comprising a member movable in said slot and having a constant excursion, a yieldable connection between said drive member and said rack comprising a notch in one edge of said slot, an element carried by said drive member, a roller rotatably mounted on said element, spring means for urging said element to yieldably maintain said roller in said notch, said notch being formed to cause said roller to move out thereof and along said slot after said rack is arrested by said limiting means and upon movement of said member in one direction, said notch being also formed to receive and retain said roller therein to return said rack upon movement of said member in the opposite direction.

ROBERT E. BOYDEN.

REFERENCES CITED

The following references are of record in the file of this patent:

UNITED STATES PATENTS

| Number | Name | Date |
|---|---|---|
| 1,285,234 | Knistrom | Nov. 19, 1918 |
| 1,909,715 | Pasinski | May 16, 1933 |
| 1,977,094 | Shipley | Oct. 16, 1934 |
| 2,108,476 | Dahlberg | Feb. 15, 1938 |
| 2,241,987 | Eickman | May 13, 1941 |
| 2,355,637 | Faigle | Aug. 15, 1944 |

FOREIGN PATENTS

| Number | Country | Date |
|---|---|---|
| 173,916 | Switzerland | Mar. 16, 1935 |